United States Patent [19]

Mehrotra et al.

[11] Patent Number: 4,612,640

[45] Date of Patent: Sep. 16, 1986

[54] ERROR CHECKING AND CORRECTION CIRCUITRY FOR USE WITH AN ELECTRICALLY-PROGRAMMABLE AND ELECTRICALLY-ERASABLE MEMORY ARRAY

[75] Inventors: Sanjay Mehrotra, San Jose; Gust Perlegos, Fremont, both of Calif.

[73] Assignee: Seeq Technology, Inc., San Jose, Calif.

[21] Appl. No.: 581,685

[22] Filed: Feb. 21, 1984

[51] Int. Cl.$^4$ ............................................. G06F 11/11
[52] U.S. Cl. ..................................................... 371/51
[58] Field of Search ....................... 371/12, 13, 31, 32, 371/51, 50, 49

[56] References Cited

U.S. PATENT DOCUMENTS

| | | | |
|---|---|---|---|
| 3,619,585 | 11/1971 | Edmondson | 371/13 |
| 4,051,355 | 9/1977 | Lin | 371/51 |
| 4,059,748 | 11/1977 | Violino | 371/13 |
| 4,183,096 | 1/1980 | Cenker et al. | 371/51 |
| 4,295,219 | 10/1981 | Draper et al. | 371/51 |
| 4,464,752 | 8/1984 | Schroeder et al. | 371/51 |
| 4,464,754 | 8/1984 | Stewart et al. | 371/51 |
| 4,472,805 | 9/1984 | Wacyk et al. | 371/51 |
| 4,486,881 | 12/1984 | deCousesnon | 371/51 |
| 4,517,663 | 5/1985 | Imazeki et al. | 371/13 |
| 4,528,666 | 7/1985 | Cline et al. | 371/51 |

Primary Examiner—Michael R. Fleming
Attorney, Agent, or Firm—Lyon & Lyon

[57] ABSTRACT

An on-chip checking and correction circuit extends the program/erase endurance of a semi-conductor memory array and catches data retention failures in individual memory cells of the array. For each data byte in the memory array, four parity bits are computed using a modified Hamming Code and stored in additional bit cells associated with that data byte. During read and write operations, check bits are calculated using the same Hamming Code and used to correct single-bit errors; error checking and correction is repeated if necessary up to a predetermined number of tries.

6 Claims, 4 Drawing Figures

ERROR CHECKING AND CORRECTION CIRCUITRY FOR USE WITH AN ELECTRICALLY-PROGRAMMABLE AND ELECTRICALLY-ERASABLE MEMORY ARRAY

TECHNICAL FIELD

The present invention relates generally to semiconductor memory chips and more particularly concerns an error checking and correction circuit which is fabricated on-chip. The error checking and correction circuitry functions to detect and correct single-bit errors resulting from faulty programming of data bytes and/or data byte retention failures in the chip array.

SUMMARY OF THE INVENTION

The present invention comprises an on-chip checking and correction circuit which is useful for extending the program/erase endurance of a semiconductor memory array and for catching data retention-type failures in individual memory cells of the array. To this end, four additional memory cells are constructed on-chip for each data byte location in the memory array. During a write stage of the chip programming operation, four parity bits are computed using a modified Hamming Code. The four parity bits are appended to each data byte and stored in the additional memory cells. Immediately following the write stage, a verification procedure is performed, whereby the data byte programmed into the memory array is read out and a new set of four check bits are generated from the eight data bits in the data byte as read. The check bits are then compared to the parity bits in order to determine whether the bit patterns in the data byte as written and the bit pattern in the data byte as read are the same. If no more than a single-bit error in the data byte as read appears, an inverting operation can be performed to correct the single-bit error and a signal is generated indicating that programming has been satisfactorily completed. If no match between the data byte as written and the data byte as read can be obtained, indicating that more than a single-bit error is present in the data byte, the writing procedure is repeated for the chip until either a data match is achieved or a predetermined number of attempts at writing have been made. During read operations, the error checking and correction circuitry performs in the same manner as it did during the verification stage of programming to correct up to one erroneous bit in each data byte read from the memory array.

BRIEF DESCRIPTION OF THE DRAWINGS

The foregoing features of the present invention can be better understood by considering the following Brief Description of the Drawings in conjunction with the Best Mode for Carrying Out the Invention, wherein.

BEST MODE FOR CARRYING OUT THE INVENTION

Figure 1:
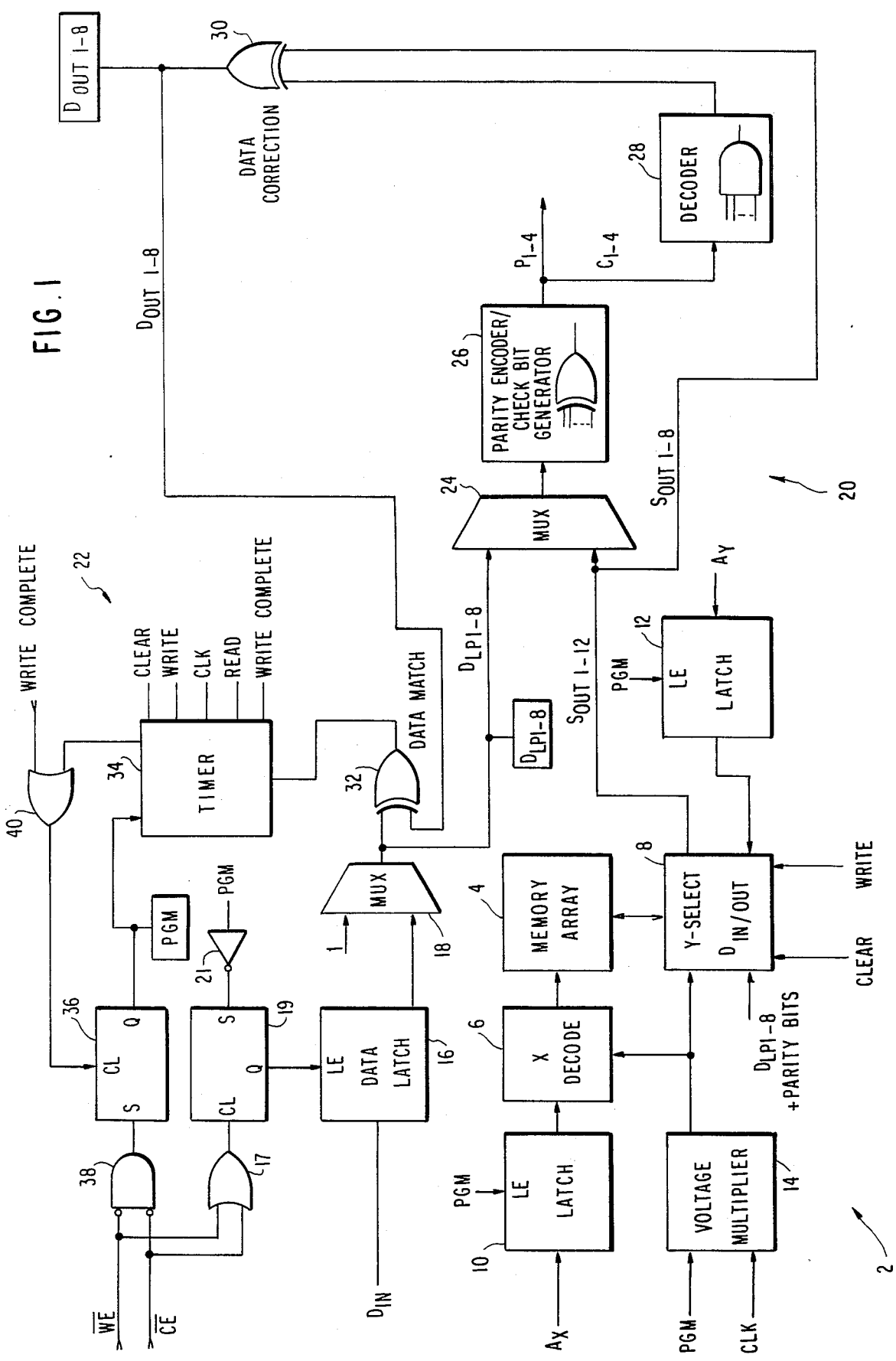
FIG. 1 is a schematic representation of the error checking and correction circuitry of the present invention.

As can be seen in FIG. 1, the error checking and correction circuitry of the present invention is intended for use with a memory chip 2 containing a memory array 4 connected to X-decoder circuitry 6 and Y-select circuitry 8. An X-address latch 10 and Y-address latch 12 may be respectively employed in conjunction with X-decoding circuitry 6 and Y-select circuitry 8 to latch the X and Y inputs $A_X$, $A_Y$ during addressing operations. A voltage multiplier 12 may also be employed to raise the voltage on the word lines linking the X-decoder to the memory array and the Y-select lines linking the Y-select circuitry to the memory array during programming. The structure of voltage multiplier 14 is more fully described in co-pending application Ser. No. 346,891, filed Feb. 8, 1982, now U.S. Pat. No. 4,511,811 and incorporated herein by reference. Data $D_{IN}$ to be stored in memory array 4 is input to memory chip 2 via a data latch 16 and first multiplexor 18. Data latch 16 is enabled by the output of an OR gate 17 which receives the chip $\overline{\text{WRITE ENABLE}}$ and the $\overline{\text{CHIP ENABLE}}$ or $\overline{\text{WE}}$ and $\overline{\text{CE}}$ signals.

Memory array 2 is preferably an electrically-programmable and electrically-erasable memory (EEPROM) constructed from a plurality of memory cells arranged in byte-accessible configuration. That is, columns of memory cells in memory array 4 are interconnected such that eight individual memory cells are present at each address location in the memory array. Hence, address inputs $A_X$ and $A_Y$ for a given byte address cause X-decoding circuitry 6 and Y-select circuitry 8 to access the eight individual data memory cells at the memory array address location associated with the given address. In order to carry out the present invention, four memory cells for storing parity bit information are also constructed in memory array 4 for each byte address. These latter or parity memory cells can be connected to the X-decoding circuitry 6 and Y-select circuitry 8 in a manner appreciated by those skilled in the art such that selection on individual bytes accessed by the X-decoding circuitry and the Y-select circuitry in response to X and Y address inputs simultaneously results in selection of the four parity memory cells associated with that byte address.

The error checking and correction circuitry of the present invention is generally indicated at 20 in FIG. 1. Error checking and correction circuitry 20, which is under the control of timing circuitry 22 during programming of the chip, includes a second multiplexor 24, a parity encoder/check bit generator 26, a decoder 28, data correction circuitry 30 and data matching circuitry 32. Timing circuitry 22 includes a timer 34, a programming latch 36 driven by exclusive NAND gate 38, and NOR gate 40, all arranged as seen in FIG. 1. Timer 34 functions as a state machine, as will be appreciated by those skilled in the art, and can operate in one of four states, e.g., a CLEAR, state a WRITE state, a VERIFY state and a WRITE COMPLETE state. The timer accordingly outputs a CLEAR signal indicative of the CLEAR state, a WRITE signal indicative of the WRITE state, first and second READ signals indicative of VERIFY state and a WRITE COMPLETE signal indicative of the WRITE COMPLETE state. Timer 32 also outputs a clock or CLK signal during the WRITE state to enable operation of voltage multiplier 14. Timer operation is initiated by a programming signal PGM supplied by the Q output of programming latch 36. The PGM signal, which also enables X address latch 10 and Y address latch 12 and supplies an inverter 21 connected to the S input of latch 19, switches high when the S input of programming latch 36 is driven high by the output of exclusive NAND gate 38. The output of gate 38 is in turn driven high by the simultaneous occurrence of the low $\overline{WE}$ and $\overline{CE}$ signals.

Multiplexor 24 is connected to both multiplexor 18 and Y-select circuitry 8, alternately receiving therefrom the data byte $D_{LP1-8}$ to be written into memory array 4 and the data byte plus associated parity bits $S_{out1-12}$ read from memory array 4. When timer 34 in timing circuitry 22 is in the WRITE state, multiplexor 24 passes the data byte $D_{LP1-8}$ to parity encoder/check bit generator 26, whereupon the parity encoder/check bit generator generates four parity bits $P_{1-4}$ in accordance with a modified Hamming Code (see Hamming, R. W., "Error Detecting and Error Correcting Codes", *Bell System Technical Journal,* Vol. 26, pp, 147–160, April 1950). The exact pattern of parity bits $P_{1-4}$ depends upon the bit pattern of data byte $D_{LP1-8}$. Once the parity bits have been generated, they are passed along with the data byte to Y-select circuitry 8 for actual programming into memory array 4 to the byte location selected by the X and Y address inputs $A_X$, $A_Y$. When timer 34 is in a VERIFY state, multiplexor 24 passes the data byte/parity bits $S_{out1-12}$ to parity encoder/check bit generator 26, which then generates four checks bits $C_{1-4}$ using the same modified Hamming Code employed to supply the original parity bits $P_{1-4}$. Check bits $C_{1-4}$ are supplied to decoding circuit 28 and there utilized to generate a series of logic signals which are combined in data correction circuitry 30 with the eight bits $S_{out1-8}$ of the data byte read from memory array 4. If the data byte has been read correctly from memory array 4, the byte is simply passed as $D_{out1-8}$ from data correction circuitry 30 to data matching circuitry 32. If, however, a 1-bit error has occurred in the reading of the data byte from memory array 4, data correction circuitry 30 is capable of correcting this one error before passing the data byte on to data matching circuitry 32. In particular, the data correction circuitry can identify the incorrect bit in the data byte read under a one-bit error condition and invert the identified bit to provide the aforementioned correction.

When memory chip 2 is in a programming mode, data matching circuitry 32, which is indicated schematically as an exclusive OR gate in FIG. 1, performs a comparison between the corrected byte $D_{out1-8}$ leaving data correction circuitry 30 and the original byte $D_{LP1-8}$ input to memory chip 2 via data latch 16 and multiplexor 18. Data matching circuitry 32 signals timer 34 when a match between $D_{out1-8}$ in $D_{in}$ is achieved. If no such match is present, it can be assumed either that programming of the byte into memory array 4 is not complete or that an error has occurred in writing the byte into the memory array or reading the byte from the memory array. Under such circumstances, timer 34 returns to the WRITE state (or CLEAR state if clearing of the memory array is underway) and attempts to rewrite byte $D_{1-8}$ into the memory array. This sequence of writing, comparing and rewriting continues until either a data match in data matching circuitry 32 is obtained or until a predetermined number of write and read attempts have been made.

Figures 2, 3:
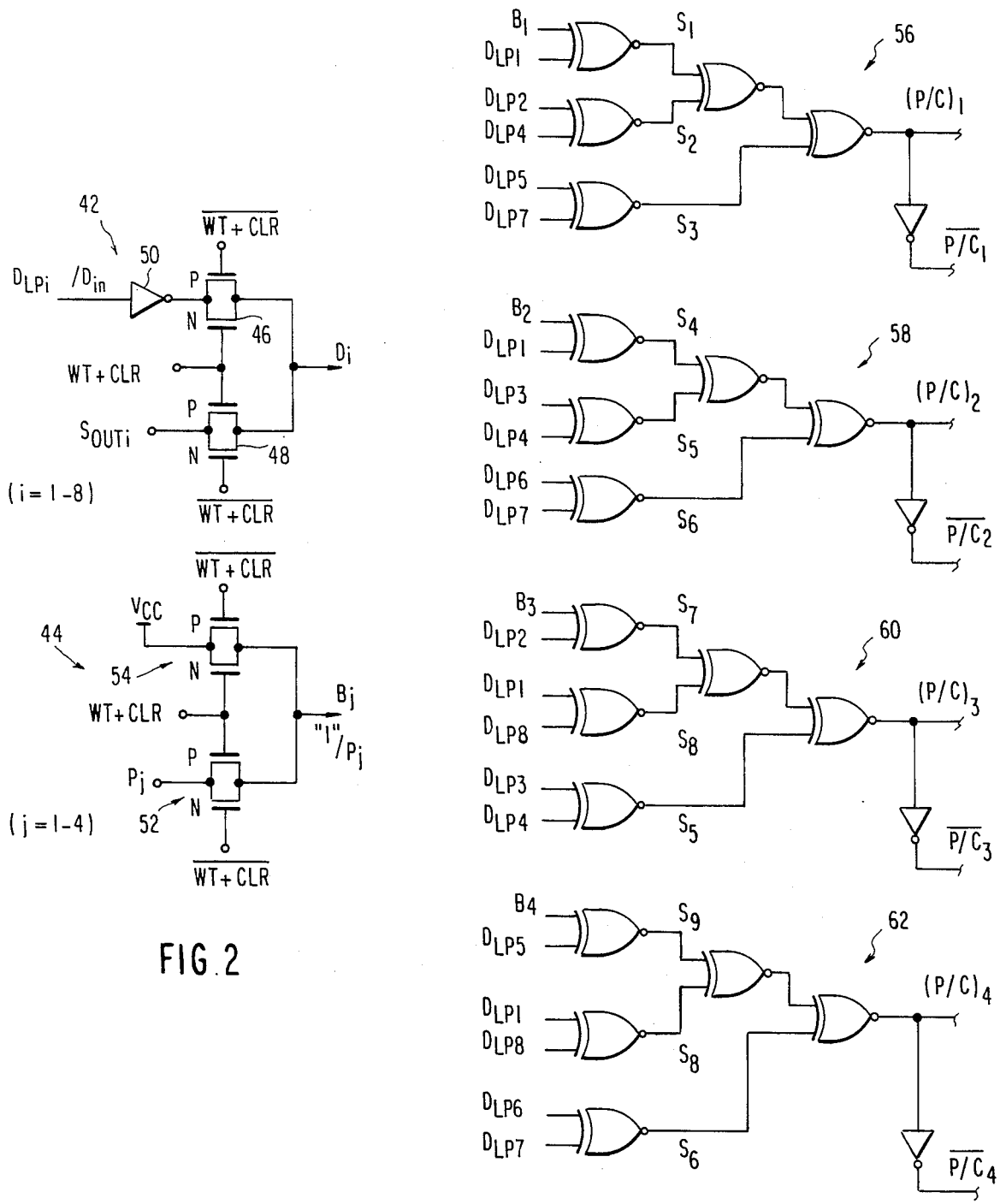
FIG. 2 is a detailed circuit diagram of the multiplexor employed in the error checking and correction circuitry of FIG. 1.
FIG. 3 is a detailed circuit diagram of the parity encoder/check bit generator employed in the error correction circuitry of FIG. 1.

FIG. 2 provides a detailed view of the circuitry in multiplexor 24. More particularly, multiplexor 24 is comprised of a series of CMOS switching circuits. The first eight switching circuits, a representative one of which is illustrated at 42 in FIG. 2, process data bits while the remaining switching circuits, a representative one of which is shown at 44 in FIG. 2, process parity bits. Switching circuit 42 includes a pair of CMOS switches 46 and 48 driven by the WRITE plus CLEAR signals output from timer 34. Switch 46 is connected to an inverter 50 which receives a data bit $D_{LPi}$ from multiplexor 18. Switch 48 receives a data bit $S_{outi}$ from Y-select circuitry 8. Thus, when timer 34 is in a WRITE state, data bit $D_{LPi}$ is passed through to the parity encoder/check bit generator while data bit $S_{outi}$ passes through to the parity encoder/check bit generator when timer 34 is in a VERIFY mode. A similar arrangement of CMOS switches 52, 54 in switching circuit 44 produce a logic output $B_j$ equal to $V_{cc}$ or "one" during WRITE operation of the timer and equal to the value of the parity bit $P_j$ during both VERIFY operation of the timer or normal read mode operation of the memory chip.

FIG. 3 illustrates the organization of the parity/check bit generator 26. In particular, a series of exclusive NOR gate circuits 56, 58, 60 and 62 arranged according to modified Hamming Code convention processes the various bits of data byte $D_{LP1-8}$ output from switching circuits 42 of multiplexor 24 and the logic bits $B_{1-4}$ output from switching circuits 44 of multiplexor 24 to generate the parity bits $P_{1-4}$ during timer WRITE operation. During timer VERIFY operation, exclusive NOR gate circuits 56–62 receive the data byte and associated parity bits $S_{out1-12}$, generating the check bits $C_{1-4}$ in response thereto.

Figure 4:
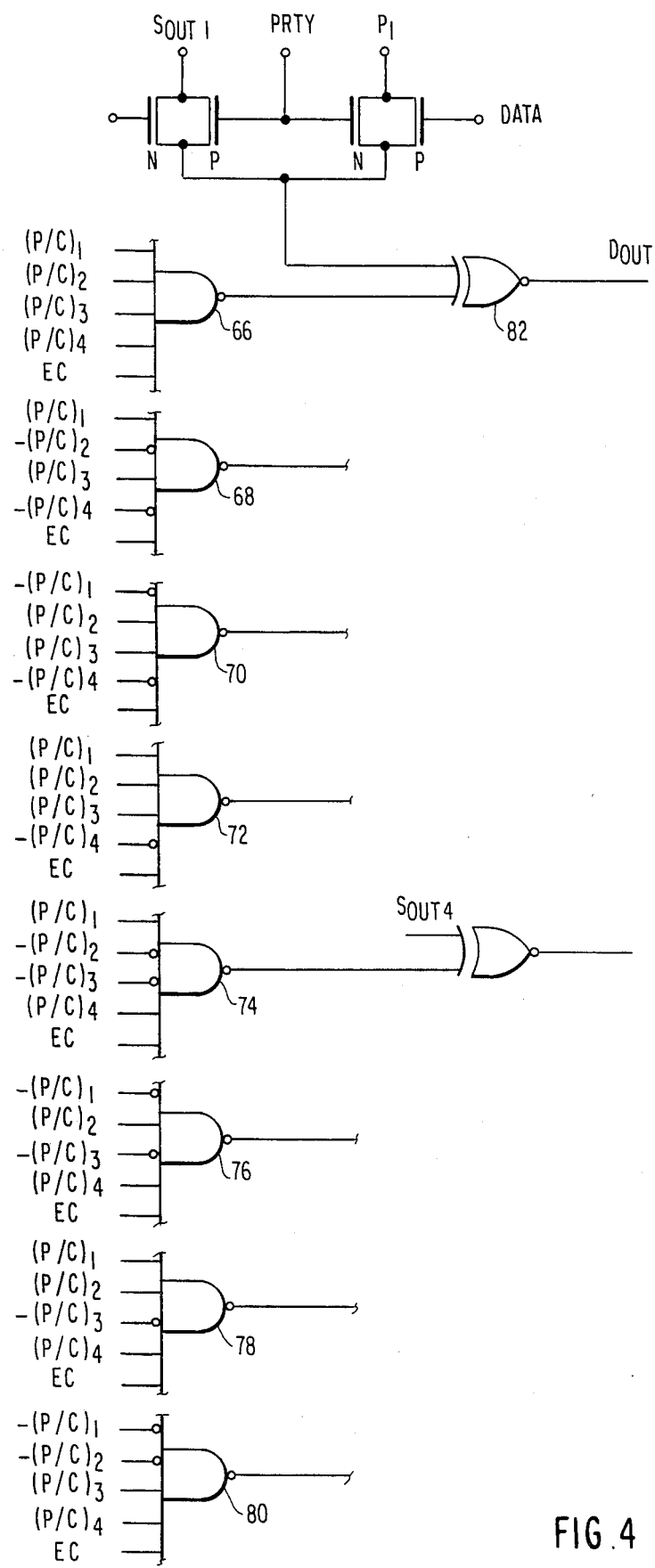
FIG. 4 is a detailed circuit diagram of the decoder circuit used with the error checking and circuitry of FIG. 1.

The organization of the decoder circuit 28 and data correction circuitry 30 can be seen in FIG. 4. Decoder 28 specifically comprises a series of NAND gates 66–80 arranged as shown to provide logic outputs which can in turn be used to correct an erroneous data bit in the byte $S_{out1-8}$ read from memory array 4 during VERIFY operation of timer 34 or during read operation of the chip. Correction of the erroneous bit is accomplished by passing the byte $S_{1-8}$ through exclusive NOR gates such as the gate 82 used in conjunction with the $S_{out1}$ bit in FIG. 4. Depending upon whether or not an error has been detected in an individual bit of byte $S_{out1-8}$, the logic outputs from NAND gates 66–80 cause the exclusive NOR gates to either pass or invert the byte $S_{out1-8}$ to produce the corrected byte $D_{out1-8}$.

The operation of the present invention will now be explained. During the programming mode of the memory chip, the $\overline{WRITE\ ENABLE}$ and $\overline{CHIP\ ENABLE}$ signals both switch low, causing the output of exclusive NAND gate 38 to drive the SET input of programming latch 36 high at the later of the two falling transitions of the $\overline{WRITE\ ENABLE}$ and $\overline{CHIP\ ENABLE}$ signals. The Q output, e.g., the PGM signal, of the programming latch in turn switches high to start timer 34. The address inputs $A_X$ and $A_Y$ associated with the desired address location of data byte $D_{IN}$ are also input at this time through address latches 10 and 12 to the X-decoder 6 and Y-select circuitry 8 for the purpose of accessing the desired data byte location in memory array 4. The data byte $D_{IN}$ to be programmed, meanwhile, is latched into data latch 16 at the first rising edge of the $\overline{WRITE\ ENABLE}$ or $\overline{CHIP\ ENABLE}$ signal (which may occur as soon as 100 nanoseconds after the addresses are latched and no more than 1 microsecond after.). The first timer start is the CLEAR state. Accordingly, a CLEAR signal is output from timer 34 to initiate clearing of memory array 4, i.e., to assist in writing all logic "ones" into the data cells at the selected byte address. To this end, eight logic "ones" are suplied through multiplexor 18 to the $D_{LP1-8}$ multiplexor output. The logic ones are then directed from multiplexor 24 in error checking and correction circuitry 20 to the parity encoder/check bit generator 26, where a series of parity bits $P_{1-4}$ corresponding to the logic "ones" values of the $D_{LP1-8}$ bits are generated. Turning to FIGS. 2 and 3, it is apparent that the values of the parity bits $P_{1-4}$ associated with a "clear" byte are all likewise logic "ones". These parity bits, along with the "clear" byte, are directed to Y-select circuitry 8 and are programmed into memory array 4.

After an interval, for example 0.5 msec, determined by the internal clock in timer 34, the timer CLEAR signal goes low and the timer advances to its next state, outputting a first READ signal. The CLK output from timer simultaneously switches low to turn off voltage multiplier 14, thereby suspending any programming in the memory array 4. The sense amplifiers (not shown) in Y-select circuitry 8 are next enabled to permit reading of the "clear" byte and associated parity bits which have been programmed into the memory array. Verification that all of the memory cells at the desired byte location in memory array 4 have in fact been cleared is accomplished by supplying the "clear" byte as read e.g., $S_{out1-8}$, and the associated parity bits e.g., $S_{out9-12}$, to error checking and correction circuitry 20. The "clear" byte and parity bits pass through multiplexor 24 to the parity encoder/check bit generator 26 and four check bits $C_{1-4}$ (which should all be logic "ones", assuming that the "clear" byte has been correctly programmed and read) are generated. The check bits $C_{1-4}$ are then processed in decoder 28 to provide the aforementioned decoder outputs, which decoder outputs are used in the data correction circuitry 30 to detect whether a single-bit error has occurred in the "clear" byte read from memory array 4 and, if so, to correct that single-bit error. The "clear" byte is finally passed as an output byte $D_{out1-8}$ from data correction circuitry 30 to data matching circuitry 32, where a comparison with the original "clear" byte supplied by multiplexor 18 is performed. If a match between the original "clear" byte $D_{LP1-8}$ and the output byte $D_{out1-8}$ from data correction circuitry 30 is obtained, data matching circuitry 32 outputs a signal which moves timer 34 to the next state. If no match is indicated, timer 34 will return to the CLEAR state and again attempt to clear the memory cells. The sequence of CLEAR and READ steps will thereafter continue until either a match does occur or until a predetermined number of clear cycles, for example, 64 cycles, have been attempted. In the latter event, a TIMER EXPIRED signal is generated by timer 34 to reset the clear or CL input of programming latch 36 and stop the timer operation.

If a match between the original "clear" byte and the output "clear" byte has been achieved, it can be assumed that no more than one bit error has occurred during the programming and reading of the "clear" byte, and the output of data matching circuitry 32 permits timer 34 to advance to its next or WRITE state. In the WRITE state, timer 34 outputs a high WRITE signal, which causes the multiplexor 18 to output the original data byte $D_{IN}$ as the $D_{LP1-8}$ bits. In a manner analogous to that discussed in connection with the "clear" byte, the data byte is programmed or written into memory array 4 for a predetermined interval, say 0.5 msec. Timer 34 next advances to a second READ state, whereupon a second READ signal is output from timer 34 and the data byte with its associated parity bits is read from memory array 4 by Y-select circuitry 8 to provide a new set of $S_{out1-12}$ bits. A new series of check bits $C_{1-4}$ is generated as described above by parity encoder/check bit generator 26 and supplied to decoder 28 for processing. Again, data correction circuitry 30 performs a comparison and error detection function, correcting up to one bit in the data byte read from memory array 4. The $D_{out1-8}$ bits from data correction circuit 20 are again supplied to data matching circuit 32, where a second comparison between the $D_{out1-8}$ bits and the $D_{LP1-8}$ bits, i.e., between the original data byte and the data byte read from memory array 4, is carried out. If a match between the original data byte and the data byte read from memory array 4 is obtained, the programming operation has been successfully completed and the data matching circuitry signals timer 34 of this event, causing the timer to output a WRITE COMPLETE signal. The chip can then be placed on standby for the next programming command or a read command. If, on the other hand, no data match occurs at data matching circuitry 32, the timer returns to the WRITE state, rewriting of the data byte into memory array 4 is performed and another read of the stored data byte takes place. The rewrite and read sequence is repeated until either the data byte is read correctly, as indicated by a data match in data matching circuitry 32, or until the predetermined number of read and data matching attempts have been made, as indicated by timer 34.

When the memory chip is in a READ mode of operation, the $\overline{\text{WRITE ENABLE}}$ or $\overline{\text{WE}}$ signal is high. Exclusive NAND gate 38 outputs a low signal to disable programming latch 36, preventing timer 34 from becoming operational. The accessing of a desired byte location in memory array 4 using selected $A_X$ and $A_Y$ address signals subsequently proceeds. The data byte read from the accessed data byte location in memory array 4, and the associated parity bits stored at the desired byte location are processed by Y-select circuitry 8 to provide the $S_{out1-12}$ bits. As was the case during the programming mode of chip operation, the $S_{out1-12}$ bits are sent to error checking and correction circuitry 20 during the READ mode of chip operation, where check bits $C_{1-4}$ are generated and decoded for use in detecting errors in the data byte read from memory array 4. Data correction circuitry 30 again corrects up to one bit in the data byte as read. The corrected data byte is available for reading at the output of the data correction circuit 30. Inasmuch as timer 34 is not active during the READ mode of chip operation, however, no matching in data matching circuit 32 effectively takes place and the data byte is simply read out of the memory chip as the $D_{out1-8}$ bits output from data correction circuit 30.

The present invention has been set forth in the form of one preferred embodiment. It is nevertheless understood that various modification to the error checking and correction circuitry disclosed above can be made of those skilled in the art without departing from the scope and spirit of the present invention. It is consequently the intention of the inventors to be limited only by the scope of the following claims and their equivalents.

We claim:

1. A circuit device for use with a semiconductor memory which can operate in a write mode, the semiconductor memory having an input section which receives data to be programmed and a memory array into which the data received by the input section can be programmed during the write mode of semiconductor memory operation and from which data can be read out after programming, the semiconductor memory responding to write and read signals for respectively writing the data into and reading the data out from the memory array, said circuit device operating to determine whether the data programmed into the memory array has been properly and completely stored and to correct errors in the data so programmed, said circuit device comprising:

parity storage means in the memory array for receiving and retaining parity information on the data being programmed into the memory array;

parity encoder means connected to the input section and the memory array of the semiconductor memory and to said parity storage means, said parity encoder means operating to generate and supply said parity storage means with a first set of parity information derived as a function of the byte pattern of the data being programmed into the memory array, said parity encoder means also operating to generate a second set of parity information as a function of the byte patterns of the data read out from the memory array and the first set of parity information read from said parity storage means;

decoder means connected to receive both the data read out from the memory array and said second set of parity information from said parity encoder means, said decoder means operating to detect the occurance of errors in the data read out from the memory array, said decoder means also operating to generate corrected data by correcting said errors detected in the data;

matching means for receiving both the data being programmed and said corrected data generated by said decoder means, said matching means operating to generate a match signal when said corrected data matches the data being programmed; and timer means connected to said matching means for generating a first signal at the start of the write operation, said first signal serving as a write signal which causes the data to be programmed into the memory array, said timer means also generating a second signal at a predetermined time after said first signal is generated, said second signal serving as a read signal which causes the data programmed into the memory array and said first set of parity information supplied to said parity storage means to be read out of the memory array and sent to said parity encoder means, said timer means finally generating a third signal in response to receipt of said matching signal from said matching means, said matching signal serving to indicate that the write mode of operation of the semiconductor memory is complete.

2. A circuit device as set forth in claim 1, wherein the semiconductor memory also operates in a read mode to make available data which has been read out from the memory array, said timer means including a means for inactivating said timer means during the read mode of operation of the semiconductor memory.

3. A circuit device as set forth in claim 1, wherein said parity encoder means includes a multiplexor circuit connected to the input section of the semiconductor memory and a parity byte generator circuit which is connected to said multiplexor circuit.

4. A circuit device as set forth in claim 3, wherein said parity byte generator circuit generates said first and second sets of parity information according to a modified Hamming code.

5. A circuit device as set forth in claim 3, wherein the semiconductor memory operates in a clear mode during which the input section of the semiconductor memory outputs a series of signals having the same logic level in lieu of the data to be programmed, said timer means further operating to generate a clear signal in advance of said first signal to write the series of signals having the same logic level from the input section into the memory array, said parity encoder means further including a switch means in said multiplexor circuit for supplying said parity byte generator circuit with a second set of signals to insure that said first set of parity information generated by said panoty encoder means all has the same logic level.

6. A circuit device as set forth in claim 1, wherein said decoder means includes a decoder circuit which generates an output in response to receipt of said second set of parity information from said parity encoder means and a correction circuit connected to receive both said output from said decoder circuit and the data read out from the memory array.

* * * * *

UNITED STATES PATENT AND TRADEMARK OFFICE
CERTIFICATE OF CORRECTION

PATENT NO. : 4,612,640

DATED : September 16, 1986

INVENTOR(S) : Sanjay Mehrotra, Gus Perlegos

It is certified that error appears in the above—identified patent and that said Letters Patent is hereby corrected as shown below:

Claim 5

Column 8, Line 39, "parity" is misspelled "panoty".

Signed and Sealed this

Twenty-fourth Day of May, 1988

*Attest:*

DONALD J. QUIGG

*Attesting Officer*  *Commissioner of Patents and Trademarks*